United States Patent [19]

Lindström et al.

[11] 4,362,600

[45] Dec. 7, 1982

[54] USE OF POLYALKYLENE OXIDES FOR THE SEPARATION OF CELLULOSE FIBRES

[75] Inventors: Tom S. C. Lindström, Sollentuna; Lennart H. Westman, Saltsjö-Boo, both of Sweden

[73] Assignees: AB CASCO; Svenska Traforskningsinstitutet, both of Stockholm, Sweden

[21] Appl. No.: 293,212

[22] PCT Filed: Dec. 23, 1980

[86] PCT No.: PCT/SE80/00347
§ 371 Date: Aug. 12, 1981
§ 102(e) Date: Aug. 12, 1981

[87] PCT Pub. No.: WO81/02030
PCT Pub. Date: Jul. 23, 1981

[30] Foreign Application Priority Data

Dec. 23, 1980 [SE] Sweden ............................ 8000141

[51] Int. Cl.$^3$ .............................................. D21C 9/00
[52] U.S. Cl. ........................................ 162/55; 162/5; 162/190; 162/191; 209/5
[58] Field of Search .................. 162/5, 55, 190, 191; 210/732, 705; 209/5

[56] References Cited

U.S. PATENT DOCUMENTS 3,141,816  7/1964  Manley .............................. 162/190
3,884,750  5/1975  Iannazzi .............................. 162/5

*Primary Examiner*—William F. Smith
*Attorney, Agent, or Firm*—Fred Philpitt

[57] ABSTRACT

Unbleached sulphae fibres are chemically separated from other fibres by the use of high molecular polyalkylene oxides, preferably polyethylene oxide. The polyalkylene oxides are added to aqueous suspensions of fibre mixtures and hereby flocculates unbleached sulphate fibres in a selective manner and the flocks can be separated by known methods such as sedimentation, flotation, filtration etc. Use of polyalkylene oxides for selective flocculation of unbleached sulphate fibres gives the possibility of upgrading for example recovered fibres, broke and secondary fibre raw materials.

5 Claims, No Drawings

USE OF POLYALKYLENE OXIDES FOR THE SEPARATION OF CELLULOSE FIBRES

The present invention relates to chemical separation of cellulose fibres and more particularly it relates to the use of high molecular weight polyalkylene oxides for separation of unbleached sulphate fibres from mixed cellulose pulps. The invention can be applied in connection with recycling of secondary fibres, broke etc., for subsequent production of paper, board, paperboard and similar products.

Paper, board, paperboard etc. is for the most part manufactured from the following kinds of pulps: mechanical pulp—including both pulp prepared by purely mechanical means and thermomechanical pulp—, sulphite and sulphate pulps, and semi-chemical sulphite pulp, e.g. NSSC-pulp. Mechanical and thermomechanical pulps contain substantially all of the original components of the wood or the raw material, but for the other kinds of pulp, lignin and other non-cellulosic components have been removed to a varying extent by pulping. Depending on the intended field of use, the pulps are subjected to further treatment in the form of bleaching. Bleaching is the term used for chemical treatment of pulps with different kinds of chemicals, e.g. chlorine, chlorine dioxide, hypochlorite, peroxide, oxygen, dithionite etc., to produce a brighter pulp and it involves mainly a removal and/or a chemical modification of the lignin.

At the production of e.g. multi-layer paper or paper board, different pulps are used for the different layers, and broke and white water from these processes will thus contain mixtures of fibres. Mixed pulps are also obtained in the increased handling of waste paper. According to the invention mixed pulps from such processes can be worked up to different fractions and thereafter be utilized with improved economy and in an improved technical manner.

Broke and reclaimed fibres from the production of paper, paper board and similar products including different kinds of pulps are generally utilized in integrated systems without preceding separation. Large quantities of originally high quality pulp suited for the production of products with high economic value are hereby utilized in a very uneconomical manner. Considerable economic advantages can be gained by converting pulp blends into pure pulp fractions. Upgrading pulp mixtures also gives advantages in that the subsequent production of paper products can be controlled in a better way as far as chemicals and process variables are concerned than for systems of unspecific and varying mixtures. As examples of systems wherein different pulps are used and wherein reclaiming of broke and fibre alurry is valuable can be mentioned e.g. the production of corrugated fibreboard where the corrugated layer is made up from NSSC and/or recycled fibre pulp, while the facings (linerboard) are made up from unbleached sulphate pulp. Further, there can be mentioned multi-layer products wherein one or more layers have been produced from bleached pulp, to obtain a better appearance or to improve the printability, but which contain layers of unbleached sulphate in order that they will possess the required strength.

In the handling of waste paper, in which paper or board after use, is reclaimed and after slushing and optionally de-inking, is re-used for the production of paper products, the incoming waste material contains mixtures of pulps of different types and it is here highly desirable that the material, to the greatest possible extent, can be sorted and classified to give the best utilization. The sources of the waste material vary to a great extent, e.g. from households, where the largest part is made up from newsprint and magazine paper, to industries and offices, where the waste is a mixture of printing and writing paper, paperboard, sacks, newsprint etc. Collected waste paper is—if sorted at all—sorted manually and it is evident that this sorting cannot give a total grading of all the material in uniform groups. A large part of the material will be classified as "mixed" and used for, or as part of, products with lower quality requirements, e.g. as middle-layer in paperboard such as chipboard. Even in quantities of waste paper of a comparatively great uniformity, mixtures of cellulose pulps will of course be present as it is impossible to obtain a total separation of these by manual sorting. As even very small amounts of a foreign kind of pulp may make an otherwise high-quality raw material unsuitable for the intended field of utilization, an additional separation would be of great importance even in this case.

It has now been found that polyalkylene oxides are capable of flocculating unbleached sulphate fibres (unbleached sulphate fibres, unbleached sulphate, or kraft, pulp) selectively from mixed woodfibre-based pulps.

It is known to use high molecular weight polyalkylene oxides in the paper industry. Like other water-soluble polymers, such as polyacrylamide and polyethyleneimine, they have been used as retention agents and dewatering agents. These agents are added to the paper stock to give an improved retention of fibres, fines, pigments, fillers etc. on the wire and they should, at the same time, facilitate drainage and thereby increase the production capacity. The polyalkylene oxides have further been used for purification of process water in the paper industry and they have then been added to the white water system in flotation type of systems to improve the total flotation of fibres and other suspended materials as described in the U.S. Pat. No. 3,141,816.

As it has now been found that high molecular polyalkylene oxides can flocculate unbleached sulphate fibres essentially selectively a possibility is thus obtained to chemically separate and upgrade mixtures of pulps in reclaimed fibres from recovery units, in broke and secondary fibre raw materials to improve the economy in their further use and so that they can be used to produce products where demands on quality and uniformity are higher than now generally is the case.

The invention thus relates to the use of high molecular polyalkylene oxides for separation of unbleached sulphate fibres from fibre mixtures being suspended in water. By adding polyalkylene oxides to such systems a selective flocculation of the unbleached sulphate fibres is obtained and the formed flocks can then be separated by means of known separation methods such as sedimentation, flotation, filtration etc.

The polyalkylene oxides used in the invention are water-soluble nonionic polyalkylene oxides wherein the alkylene groups are lower alkylene groups such as ethylene-, propylene-, butylene groups or mixtures of these. Preferably polyethylene oxides are used. The molecular weight of the polyalkylene oxides should exceed 50,000 and can be as high as $20 \cdot 10^6$. It is suitably above 100,000 and preferably above 500,000. The molecular weight can suitably be within the range $500,000-20 \cdot 10^6$ and preferably within the range $10^6-20 \cdot 10^6$.

The total pulp concentration in the systems wherein the polyalkylene oxides are used should not be too high as there is otherwise a risk that networks of fibres will spontaneously form in a mechanical way. The concentration at which networks of fibres are formed varies with the type of fibres and the degree of beating. The formation of fibre networks can be counteracted by generating shearing forces or turbulence in the systems to disperse the fibres before the addition of the polymer. In most cases it is suitable that the pulp concentration at separation according to the invention does not exceed 0.9 percent by weight and it should preferably be below 0.5 percent by wight.

The amount of polyalkylene oxide required to obtain a good separation varies mainly with the pH and the ionic strength of the systems and a higher dosage is generally required at a higher pH and/or lower ionic strength. An addition of 0.001–3.0 percent by weight based on the amount of unbleached sulphate pulp in the fibre mixture is suitable for most systems and the amount added is preferably within the range of 0.01–0.5 percent by weight. For each individual system the amount should be adjusted with respect to pH and ionic strength and over-dosage should be avoided as the flocculation of the unbleached sulphate fibres will then occur so rapidly that there is a risk of purely mechanical inclusion of other types of fibres in the flocks. Overdosage should also be avoided in order to avoid loading the obtained pulp fractions with foreign chemicals unnecessarily. As the amounts of polyalkylene oxides which are required are small and as the polyalkylene oxides are extremely viscous it is most suitable to add them in the form of very dilute solutions.

With respect to the relationship between added amount and pH for obtaining a good separation mentioned above, it is suitable that the systems have a lower pH, suitably below 7 and preferably within the range of 3 to 5.

When unbleached sulpahte fibres have been flocculated from pulp mixtures using polyalkylene oxides according to the invention the obtained flocks are separated in a manner known per se, e.g. by flotation, filtration, sedimentation etc., and the resulting pulp is subsequently recovered. When the flocculated sulphate fibres are separated the turbulence in the systems should not be too high to avoid the risk that the flocks break up. As an example of a suitable method for separation can be mentioned so-called micro-flotation utilizing air-bubbles of a smaller size than normally used in flotation and wherein rising air-bubbles mechanically catches the formed flocks. The mechanical separation can be facilitated by the presence of surface active substances such as e.g. foaming agents.

Unbleached sulphate fibres here refers to cellulose pulp prepared by conventional treatment according to the sulphate process. This type of pulp is sometimes called kraft pulp due to the strength products prepared therefrom usually have. Cooking is carried out to different yields with respect to the original weight of the raw material and in the term sulphate pulp both so-called low-yield and high-yield pulps are included.

According to the invention unbleached sulphate pulp can be separated from other wood-based pulps, from bleached pulps of different kinds—bleached sulphate pulp, bleached sulphite pulp, bleached mechanical pulps—from unbleached sulphite pulp, mechanical and thermomechanical pulps and so-called NSSC-pulps (neutral sulphite semi-chemical) and mixtures of such pulps.

Whenever unbleached sulphate fibres are present in mixtures these fibres can be separated according to the invention and a fractionation of the mixtures are thus obtained and this means that subsequent utilization is improved both with respect to technical and economical factors. The polyalkylene oxides are preferably used for the separation of unbleached sulphate fibres from fibre mixtures originating from secondary fibre raw materials and from broke and recovered fibre material from the production of two- or multilayered paper products in integrated systems.

EXAMPLE 1

In a screening-test the flocculation effect of polyethylene oxide on different types of fibres was investigated.

Polyethylene oxide having an average molecular weight of $4 \cdot 10^6$ (according to the manufacturer) was added to fibre suspensions and the flocculation effect was observed visually. At the tests the amount of added polyethylene oxide was varied up to 1 percent by weight, based on dry fibre, the pH was varied between 3 and 9 and the concentration of NaCl between 0 and 0.1 molar.

The following pulps were investigated in the tests:
1. Unbleached sulphate pulp (cooked to 47% yield, based on the wood)
2. Unbleached sulphate pulp (cooked to 59% yield, based on the wood)
3. Groundwood pulp, mixture of bleached and unbleached
4. Thermomechanical pulp, mixture of bleached and unbleached
5. Semi-bleached sulphate pulp
6. Sulphite pulp, mixture of unbleached and bleached
7. NSSC-pulp It was found that the polyethylene oxide did not have any flocculating effect on the pulps 3.–7., while it in all cases flocculated the unbleached sulphate pulps 1. and 2.

EXAMPLE 2

The separation effect of different polyethylene oxides on unbleached sulphate fibres under varying conditions was investigated in a testing apparatus. The apparatus consisted of a glass cylinder, diameter about 10 cm and height about 20 cm, which in its lower part was equipped with a glass filter disc through which nitrogen gas was bubbled for flotation.

The pulp-system was a 50/50 mixture of bleached sulphate and unbleached sulphate, the later being cooked to a yield of 47% based on the wood, both having fibres within the 30–50 mesh fraction. The total fibre concentration in the system was 200 mg/l.

After flotation for 20 minutes the fibre composition in the flotate was measured by means of kappa number determination according to SCAN-C 1:77, modified for measuring small amounts.

The results of the separation tests are shown in the tables below.

TABLE 1

| pH | NaCl M | Polyethylene oxide $M_w = 4 \cdot 10^6$ Amount based on unbleached fibres % | Total flotated amount % | Unbleached fibres in flotate % | Bleached fibres in sedimentate % |
|---|---|---|---|---|---|
| 3 | 0 | 0.05 | 64.2 | 69.2 | 84.4 |
| 5 | 0 | 1.0 | 61.5 | 72.4 | 85.8 |

TABLE 1-continued

| pH | NaCl M | Polyethylene oxide $M_w = 4.10^6$ Amount based on unbleached fibres % | Total floated amount % | Unbleached fibres in flotate % | Bleached fibres in sedimentate % |
|---|---|---|---|---|---|
| 5 | $10^{-3}$ | 0.1 | 58.3 | 73.6 | 82.9 |
| 5 | $10^{-1}$ | 0.025 | 60.3 | 71.2 | 82.3 |
| 9 | 0 | 1.0 | 41.9 | 74.9 | 67.9 |

TABLE 2

| pH | NaCl M | Polyethylene oxide $M_w = 4.10^5$ Amount based on unbleached fibres % | Total floated amount % | Unbleached fibres in flotate % | Bleached fibres in sedimentate % |
|---|---|---|---|---|---|
| 5 | $10^{-3}$ | 1.0 | 50.8 | 77.6 | 78.5 |
| 5 | $10^{-1}$ | 0.2 | 44.4 | 74.3 | 69.4 |

TABLE 3

| pH | NaCl M | Polyethylene oxide $M_w = 4.10^6$ Amount based on unbleached fibres % | Total floated amount % | Unbleached fibres in flotate % | Bleached fibres in sedimentate % |
|---|---|---|---|---|---|
| 5 | $10^{-3}$ | 0.025 | 50.3 | 77.1 | 77.4 |
| 5 | $10^{-3}$ | 0.1 | 51.0 | 74.3 | 75.2 |

We claim:

1. A method of separating unbleached sulphate fibers from an aqueous suspension of fibre mixtures including unbleached sulphate fibres, which method comprises adding to the suspension a polyalkylene oxide having a molecular weight above 50,000 in an amount sufficient to essentially selectively flocculate said unbleached sulphate, whereby said unbleached sulphate fibres may be subsequently removed.

2. A method of separating unbleached sulphate fibres from an aqueous suspension of fibre mixtures including unbleached sulphate fibres, which method comprises adding to the suspension a polyalkylene oxide having a molecular weight above 50,000 and in an amount of 0.001 to 3 percent by weight, on a dry basis based on the amount of dry unbleached sulphate pulp in the suspension, to essentially selectively flocculate said unbleached sulphate fibres, whereby said unbleached sulphate fibers may be subsequently removed.

3. A method according to claim 1 or 2, wherein said polyalkylene oxide is polyethylene oxide.

4. A method according to claim 1 or 2, wherein the total fibre concentration in the suspension does not exceed 0.9 percent by weight.

5. A method according to claim 1 or 2, wherein the pH of the system is below 7.

* * * * *